(12) United States Patent
Sakamoto et al.

(10) Patent No.: US 6,596,191 B2
(45) Date of Patent: *Jul. 22, 2003

(54) OXYGEN ABSORBING COMPOSITION, OXYGEN ABSORBING RESIN COMPOSITION USING THE OXYGEN ABSORBING COMPOSITION, AND PRESERVING METHOD UTILIZING THESE COMPOSITIONS

(75) Inventors: Masaru Sakamoto, Tokyo (JP); Masaki Nagata, Tokyo (JP)

(73) Assignee: Mitsubishi Gas Chemical Company, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 123 days.

This patent is subject to a terminal disclaimer.

(21) Appl. No.: 09/324,649

(22) Filed: Jun. 3, 1999

(65) Prior Publication Data

US 2001/0048096 A1 Dec. 6, 2001

(30) Foreign Application Priority Data

Jun. 3, 1998 (JP) .......................... 10-154461

(51) Int. Cl.$^7$ .............. C09K 3/00; C08K 3/10; C08K 3/08
(52) U.S. Cl. ............ 252/188.28; 524/435; 524/440
(58) Field of Search ............... 252/188.28; 524/435, 524/440

(56) References Cited

U.S. PATENT DOCUMENTS

| | | | |
|---|---|---|---|
| 4,172,503 A | | 10/1979 | Ishioka et al. ............... 180/313 |
| 5,641,425 A | * | 6/1997 | McKedy et al. ....... 252/188.28 |
| 5,889,093 A | * | 3/1999 | Hatakeyama et al. ......... 524/80 |

FOREIGN PATENT DOCUMENTS

| | | |
|---|---|---|
| EP | 0 329 897 | 8/1989 |
| EP | 0 657 277 A2 | 6/1995 |
| EP | 0 787 764 A2 | 8/1997 |
| JP | 56-33980 | 8/1981 |
| JP | 57-31449 | 7/1982 |
| JP | 2-72851 | 3/1990 |
| JP | 7-137761 | 5/1995 |
| JP | 7-219430 | 8/1995 |

\* cited by examiner

Primary Examiner—Peter D. Mulcahy
(74) Attorney, Agent, or Firm—Nixon Peabody LLP; Adele M. Stamper

(57) ABSTRACT

Provided is an oxygen absorbing composition and an oxygen absorbing resin composition employing such oxygen absorbing composition, which demonstrate a favorable oxygen absorbing performance even in a low-humidity environment. Use of such oxygen absorbing composition and oxygen absorbing resin composition allows preservation of medicines or foods etc. which are in a dry state and disfavoring moisture.

The oxygen absorbing composition according to the present invention comprises iron powder/iodine, or iron powder/iodine/metallic iodine.

29 Claims, No Drawings

OXYGEN ABSORBING COMPOSITION, OXYGEN ABSORBING RESIN COMPOSITION USING THE OXYGEN ABSORBING COMPOSITION, AND PRESERVING METHOD UTILIZING THESE COMPOSITIONS

BACKGROUND OF THE INVENTION

1. Field of the Invention

The present invention relates to an oxygen absorbing composition having an oxygen absorbing ability in a low-humidity environment, and to an oxygen absorbing resin composition including such a composition and thermoplastic resin. More particularly, the present invention relates to an oxygen absorbing composition including iron powder and iodine, or an oxygen absorbing composition including iron powder, iodine and metal iodide, and also to an oxygen absorbing resin composition including the oxygen absorbing composition above and thermoplastic resin.

Furthermore, the present invention relates to a product preserving method using the aforementioned oxygen absorbing composition or oxygen absorbing resin composition, especially to a method of preserving medicines or foods etc. which are in a dry state and disfavoring moisture.

2. Description of Related Art

Conventionally, oxygen absorbers utilizing the oxidizing reaction of reduced metals have been widely known. In addition to reduced metal, these oxygen absorbers include metal halide as a catalyst for accelerating oxidizing reaction.

Oxygen absorbers of this type are placed in containers together with food or other products so as to maintain the freshness of such products. In other cases they are adhered to the inside of the containers for the purpose of preserving food or other products.

A typical oxygen absorber of this type is disclosed, for example, in the Japanese Patent (Kokoku) Publication No. SHO 56-33980. This oxygen absorber includes metal powder such as iron powder, and metal halide. More specifically, the oxygen absorber has a structure of metal powder coated with metal halide. An oxygen absorber of this type requires supply of water from the environment upon absorption of the oxygen, and therefore, is called a "moisture-dependent oxygen absorber." Such an oxygen absorber is used for high water-content foods which permit use of water vaporizing from the preserved product.

On the other hand, in order to preserve dried foods etc. having a low water content (in other words, having low water activity), a typical oxygen absorber includes a water provider for supplying water needed for the oxygen absorbing reaction. An oxygen absorber of this type is known as a "self-reacting oxygen absorber" because it is capable of absorbing oxygen without depending on the water vaporing from the packaged substance. Such an oxygen absorber is disclosed in the Japanese Patent (Kokoku) Publication No. SHO 57-31449.

Furthermore, oxygen absorber packets, which are oxygen absorbing resin sheets wrapped in a gas-permeable packaging material and used as a label-, card-, or lid-type, or other types of oxygen absorber for deoxidizing and preserving food or other products are disclosed in the Japanese Patent Laid-Open Publications No. HEI 2-72851, No. HEI 7-137761, No. HEI 7-219430, etc.

However, if a self-reacting oxygen absorber holding water in itself is kneaded into resin, there is a concern that moisture held in the water-holding component might vaporize when heat is applied at the time the oxygen absorber is kneaded and made into a sheet. Furthermore, the vaporized moisture may produce foam inside the resin sheet and cause unevenness of the sheet upon extrusion, whereby formation of the sheet is made difficult.

Moreover, although a self-reacting oxygen absorber is capable of absorbing oxygen regardless of the relative humidity of the environment, moisture included in the oxygen absorber will inevitably vaporize during oxygen absorption and be transferred to the products preserved. Accordingly, there is a problem that the oxygen absorber may not be used if the products preserved are medicines and foods etc. which are in a dry state and disfavoring moisture.

Furthermore, in the case of a moisture-free oxygen absorber, it is possible to include moisture in the aforementioned oxygen absorber after It is kneaded with resin and made into a sheet. However, such a treatment requires a separate step in addition to the steps of manufacturing the oxygen absorber, and is therefore disadvantageous in the industrial manufacture. Furthermore, if an oxygen absorber provided with such a treatment is used for dried products, it is inevitable that moisture held in the oxygen absorber would vaporize and be transferred to the preserved product. Moreover, in the case of some preserved products, transfer of moisture may cause deterioration of taste (dampening), change in quality (powder formed into lumps), chemical change (hydrolysis) and other problems. Furthermore, there is a problem that moisture will vaporize from the oxygen absorber in the course of long-term preservation and the oxygen absorbing performance is reduced, whereby absorption of the oxygen intruding from outside of the container is prevented, the oxygen concentration inside the container is prevented, and the quality of the product preserved is consequently deteriorated.

Furthermore, in the case of an oxygen absorbing multilayered body comprising an oxygen absorbing resin composition as a middle layer, a barrier layer as an outer layer and a seal layer as an inner layer, it is quite difficult to keep moisture in the oxygen absorber layer which is provided as the middle layer.

Accordingly, application of conventional oxygen absorbing resin compositions has been substantially limited to high water-content products, while application to low water-content products has been difficult.

SUMMARY OF THE INVENTION

The inventors of the present invention discovered that a new oxygen absorber comprising either iron powder/iodine or iron powder/iodine/metal iodide is capable of rapid oxygen absorption without any water provider even in a low-humidity environment. Free from a concern that moisture may be absorbed by the products preserved, this new oxygen absorber is most suitable for the deoxidization and preservation of food in a dry state. The aforementioned oxygen absorber, which includes iodine or iodine/metal iodide, functions as an accelerator of the oxygen absorption reaction by iron.

The inventors of the present invention further discovered that especially iron powder coated with iodine or metal iodide salt may be favorably blended into resin, made into a sheet and thereafter drawn, and that such an oxygen absorbing resin composition is also capable of absorbing oxygen in a low-humidity environment.

As an oxygen absorber not requiring any water provider, the present invention permits preservation of products of a wider water-activity range. Especially, products having a water activity of 0.1 to 0.7, disfavoring moisture and requiring a dry environment of low humidity upon preservation, for example, dietary foods or powder- or granular-type medicines etc. may be preserved for a long time in a deoxidized state without any moisture being absorbed, whereby deterioration due to oxygen is prevented and the favorable quality of the products may be maintained.

Thus, the present invention provides an oxygen absorbing composition and an oxygen absorbing resin composition employing such oxygen absorbing composition, which demonstrate a sufficient deoxidizing performance even in a low-humidity environment.

Furthermore, the present invention provides a preserving method using an oxygen absorbing composition and an oxygen absorbing resin composition employing such oxygen absorbing composition.

More specifically, the present invention provides an oxygen absorbing composition which comprises iron powder and iodine.

Moreover, the present invention provides an oxygen absorbing composition comprising iron powder, iodine, and metal iodide.

The aforementioned metal iodide may be metal iodide of alkaline metal or metal iodide of alkaline earth metal.

Furthermore, the aforementioned metal iodide of alkaline metal or alkaline earth metal may be sodium iodide, potassium iodide, or calcium iodide.

Furthermore, the sum of the weights of iodine and metal iodide is 0.01 to 20 parts by weight per iron powder 100 parts by weight, and the weight ratio of iodine to metal iodide may be within a range of 0.1–5.

Moreover, the water content in the aforementioned oxygen absorbing composition may be 1% by weight or less.

The surface of the iron powder may be coated with a mixture of the iodine and metal iodide mentioned above.

Moreover, the oxygen absorbing resin composition according to the present invention is capable of absorbing oxygen in a low-humidity environment, and is prepared by uniformly dispersing in thermoplastic resin an oxygen absorbing composition including metal iodide salt and iron powder. The obtained oxygen absorbing resin composition may be processed as a film or a sheet having a single- or multiple-layer construction. Otherwise, the sheet may be further drawn, whereby a porous oxygen absorbing sheet having an improved oxygen absorbing performance is produced.

A further object of the present invention is to provide a method of preserving low water-content products, wherein the aforementioned oxygen absorbing resin composition is wrapped with a gas-permeable material and formed either into a bag-type oxygen absorber, or a label-type oxygen absorber comprising superposed layers of a cover sheet and an adhesive layer for adhesion, and wherein the obtained oxygen absorber is kept in a bag made of a barrier film together with a low water-content product which is to be preserved, whereby preservation of products in a low-humidity environment is made possible.

A yet further object of the present invention is to provide a method of preserving low water-content products, wherein a bag-type oxygen absorber made by wrapping the aforementioned oxygen absorbing resin composition with a gas-permeable packaging material, or a label-type oxygen absorber made by superposing a cover sheet and an adhesive for adhesion is kept in a bag made of a gas-barrier film together with a product to be preserved, whereby preservation of products in a low-humidity environment is made possible.

Specifically, the present invention provides an oxygen absorbing composition which comprises iron powder and iodine, as well as an oxygen absorbing resin composition which comprises thermoplastic resin.

Moreover, metal iodide may be further added to the aforementioned oxygen absorbing composition.

Such an oxygen absorbing composition may be composed of iron powder 100 parts by weight, metal iodide 0.01 to 20 parts by weight, and iodine 0.01 to 20 parts by weight.

Furthermore, the oxygen absorbing composition above may be composed of iron powder coated with the aforementioned iodine and metal iodide.

The metal iodide above may be metal iodide of alkaline metals or alkaline earth metals.

The weight of iodide ion ($I^-$) included in the aforementioned oxygen absorbing composition may be larger than ½ weight of iodine ($I_2$).

Moreover, the water content of the oxygen absorbing composition above may be 1% by weight or less.

Furthermore, the present invention provides an oxygen absorber packet which is made by filling the aforementioned oxygen absorbing composition in a small bag made of a gas-permeable material.

Furthermore, the present invention is also capable of providing an oxygen absorbing sheet having a thickness of 20 μm to 5 mm, which includes the aforementioned oxygen absorbing resin composition.

Furthermore, the present invention is also capable of providing a porous oxygen absorbing sheet which is made by drawing the aforementioned oxygen absorbing sheet 1.5 to 12 times the original size at least in one axial direction.

Furthermore, the present invention provides a bag-type oxygen absorber which is made by wrapping the aforementioned oxygen absorbing sheet with a gas-permeable material.

Furthermore, the present invention provides a label-type oxygen absorber made by laminating a cover sheet, the aforementioned oxygen absorbing sheet, and an adhesive layer for adhesion.

Furthermore, the present invention provides an oxygen absorbing multilayered body prepared by laminating oxygen permeating layers including an oxygen permeating thermoplastic resin, the aforementioned oxygen absorbing sheet, and a gas-barrier layer made of a gas-barrier material.

Furthermore, the present invention provides a method of preserving low water-content products, wherein a preserved product having a water activity of 0.1 to 0.7 is placed and sealed in a gas-barrier container together with the aforementioned oxygen absorber packet.

Furthermore, the present invention provides a method of preserving low water-content products, wherein a preserved product having a water activity of 0.1 to 0.7 is sealed in a gas-barrier container together with the aforementioned oxygen absorbing sheet.

Furthermore, the present invention provides a method of preserving low water-content products, wherein a preserved product having a water activity of 0.1 to 0.7 is sealed into a container, at least a part of which is made of the aforementioned oxygen absorbing multilayered body.

Furthermore, the aforementioned preserved product preferably has a water activity of 0.2 to 0.5.

Furthermore, the present invention provides a package prepared by placing and sealing a preserved product in a gas-barrier container together with the aforementioned oxygen absorbing sheet.

Furthermore, the present invention provides a package prepared by placing and sealing a preserved product in a container, at least a part of which is made of the aforementioned oxygen absorbing multilayered body.

The oxygen absorbing composition according to the present invention includes two components, i.e., iron powder/iodine, or three components, i.e., iron powder/iodine/metal iodide. This oxygen absorbing composition demonstrates a considerably high oxygen absorbing performance in a low-humidity environment as compared with the publicly-known oxygen absorbing composition comprising two components, i.e., iron powder/metal halide.

Iron powder is the main agent of the oxygen absorbing composition, and performs oxygen absorption upon its reaction with the oxygen held in the environment. Iodine, or iodine and metal iodide serve as a catalyst for accelerating the oxidation reaction.

Other components, for example, metal halides may be added to the two-component oxygen absorber according to the present invention, which includes iron powder/iodine. Among metal halides, metal iodides have the strongest effect in accelerating a catalytic action. The three-component oxygen absorber according to the present invention is thus produced.

Regarding the iron powder used in the present invention, any iron powder may be used without specific limitation to its fineness as long as an oxygen absorbing reaction takes place. Accordingly, iron powder having a partially oxidized surface or including other metals may be used. For example, reduced iron powder, electrolytic iron powder, atomized iron powder etc. are preferably used.

Furthermore, crushed or ground products of cast iron etc. are used.

For the favorable contact of iron powder with oxygen, it is preferable to make the particle size of the iron powder small, normally to have a maximum particle diameter of 10 mesh (about 1.7 mm) or less, preferably 50 mesh (about 0.3 mm) or less.

Iron powder having an excessively small particle diameter may generate fire or cause other problems when handled, and is also expensive. Therefore, it is preferable to use iron powder having an average particle diameter of 10 to 500 $\mu$m.

The specific surface area of iron powder is preferably 500 $cm^2/g$ or more.

According to the present invention, the two-component oxygen absorbing composition comprising iron powder/iodine is, for example, a powdery mixture of iron powder and iodine, which is filled in a small bag made of a gas-permeable material, produced as an oxygen absorbing packet and used for deoxidization and preservation purposes.

The weight of iodine per iron powder 100 parts by weight is preferably 0.01 to 20 parts by weight, more preferably 0.1 to 10 parts by weight. The particle size of iodine is normally less than a maximum particle diameter of 10 mesh, especially preferable if 50 mesh or less.

According to the present invention, the three-component oxygen absorbing composition comprising iron powder/iodine/metal iodide is, for example, a powdery mixture of iron, iodine, and metal iodide, wherein a mixture of iodine and metal iodide preferably adheres to the surface of the iron powder for efficient catalytic effect of iodine and metal iodide. The three-component oxygen absorbing composition, wherein a mixture of iodine and metal iodide adheres to the surface of the iron powder, prevents dispersion of iodide into the air, and demonstrates a favorable oxygen absorbing performance. "Two components" or "three components" mentioned here are minimum components, and the addition of other components is not considered.

According to the present invention, a catalyst for causing an oxygen absorbing reaction of iron includes iodine and iodide. Electrolytic metal iodide can be used as the metal iodide. Specifically, it is possible to use iodide of alkaline metals, alkaline earth metals, or iodide of transition metals such as copper, zinc, aluminum, tin, iron, cobalt, nickel, cadmium, etc.

Iodides of various metals may be specified as the metal iodides above. However, in terms of safety and catalytic performance, iodides of alkaline metals or alkaline earth metals are preferable, especially sodium iodide, potassium iodide, and calcium iodide. Furthermore, more than two metal iodides may be mixed and used.

In respect to the catalyst for the oxygen absorbing composition according to the present invention, intervention of other halides is not excluded unless the oxygen absorbing reaction is prevented. According to the preferred embodiment, the total content of iodine and iodide in the catalyst is 90% by weight, preferably 95% or more.

Although the reaction accelerator according to the present invention may be mixed with iron powder, it is preferable that the accelerator covers the iron powder. The total weight of iodine and metal iodide in iron powder 100 parts by weight is preferably 0.01 to 20 parts by weight, more preferably 0.1 to 10 parts by weight, and most preferably 0.5 to 6 parts by weight. If the total weight of iodine and metal iodide is under this range, the oxygen absorbing reaction is reduced. On the other hand, if the total weight exceeds this range, the oxygen absorber may absorb excessive moisture, elute and cause a problem.

Concerning the weight ratio of iodine to metal iodide within the oxygen absorber, the weight of iodide ion ($I^-$) is to be larger than ½ weight of iodine ($I_2$). It is preferable that the weight ratio exceeds ½ because iodine and metal iodide will then form a complex salt which will enhance the catalytic action for oxygen absorption and contribute to prevent vaporization of iodine into the air.

If the active component for reaction adheres to the surface of the iron powder, and iron powder, iodine and iodide are not separated when blended into the oxygen absorber resin, and sufficient catalytic reaction is expected, the total weight of iodine and iodide may be 0.1 to 10 parts by weight, preferably 0.5 to 6 parts by weight. Furthermore, if the weight ratio of iodine to metallic iodine salt is 1:0.65 to 10, a more preferable oxygen absorbing resin composition is produced.

An example of a method of manufacturing a three-component oxygen absorbing composition is explained below. Foremost, iodine is dissolved in a concentrated aqueous solution of metal iodide, whereby an aqueous solution of iodine and metal iodide is prepared. Thereafter, the obtained solution is sprayed onto and mixed with iron powder as the iron powder is stirred. After drying the iron powder and removing water from the powder, obtained is a granular-type oxygen absorbing composition wherein the surface of the iron powder is coated with a mixture of iodine and metal iodide. The obtained oxygen absorbing composition has a high fluidity and can be easily handled.

Iodine and metal iodide together form a complex salt, which increases the catalytic action for oxygen absorption and contributes to preventing dispersion of iodine into the air.

The water content of the oxygen absorbing composition including two or three components is preferably 1% by weight or less, more preferably 0.2% by weight or less. A water content exceeding this range not only reduces the fluidity of the oxygen absorbing composition powder and makes the preparation of the agent difficult, but also causes a problem of moisture being transferred from the agent to the product preserved.

For preventing malodor, restraining dust, and preventing blots, additives such as siliceous powder, pearlite, diatomaceous earth, aluminum hydroxide, alumina, activated carbon, water-absorbing polymer, etc. may be added to the oxygen absorbing composition as required.

The oxygen absorbing composition including either two or three components is filled in a small bag made of a gas-permeable material and formed into an oxygen absorber packet so as to be used in such a shape for preservation purposes.

As a gas-permeable material, packaging materials having an oxygen permeability of at least 100 $cm^3/m^2/24$ hr/atm (2, 50% RH), for example, a plastic film, non-woven fabric, paper etc., or a multilayered film including these materials are used.

Furthermore, the oxygen absorbing composition can be kneaded into a resin, made into a film-type oxygen absorber and used for preservation purposes.

If the oxygen absorbing composition (may also be referred to as the "oxygen absorber" hereafter) is kneaded into a resin, it is preferable to add oxides of alkaline earth metals, water absorbing agents such as diatomaceous earth, alumina, pulp, water absorbing high polymer, malodor absorbing agents such as activated carbon, molecular sheave, or color pigments such as titanium oxide, iron oxide, carbon black, etc.

Although there is no specific limitation to the thermoplastic resin for blending the oxygen absorber, materials such as polyethylene, polypropylene, various ethylene copolymers, modified polyolefine, elastomers, etc. are preferably used individually or blended.

The oxygen absorbing resin composition according to the present invention is prepared by fusing and kneading the aforementioned oxygen absorber with thermoplastic resin. Furthermore, the oxygen absorbing resin composition can be prepared also by placing the aforementioned oxygen absorber between thermoplastic-resin layers which are softened by heat. The blending ratio of the oxygen absorber to the thermoplastic resin is preferably oxygen absorber 25 to 85 parts by weight in respect to thermoplastic resin 15 to 75 parts by weight, and more preferably, oxygen absorber 30 to 70 parts by weight in respect to thermoplastic resin 30 to 70 parts by weight.

While mixing and kneading the thermoplastic resin and oxygen absorber, the water content within the oxygen absorber is preferably 1% by weight or less. Further water need not be held for the exertion of the oxygen absorbing performance. By performing the procedure above, it is possible to prevent moisture from remaining inside the sheet and unfavorable foams from being generated in the sheet.

Since the oxygen absorbing resin composition according to the present invention is made suitable for preserving low water-content products, it is preferable that the oxygen absorbing composition does not include any water-holding component in itself. The oxygen absorbing composition preferably has a water content of 1% by weight or less, more preferably 0.6% by weight or less because water content in this range allows favorable heat molding without causing any troubles such as foams being generated at the time of thermoforming processing, and a sufficient oxygen absorbing reaction is obtained in this state.

Regardless of its shape, an oxygen absorber comprising the oxygen absorbing resin composition according to the present invention permits rapid deoxidization and long-term preservation of a package holding a product having a water activity of 0.1 or more.

The thickness of the oxygen absorbing sheet is preferably 50 $\mu$m to 3 mm, and is to be suitably selected after considering the required oxygen absorption performance, processability, adhesion, filling property, etc.

If the resin composition comprising thermoplastic resin and an oxygen absorber is to be formed into a sheet for use, the thickness of the sheet will vary depending on the manner and the purpose of use. However, thickness under 50 $\mu$m may cause problems such as an oxygen absorbing sheet having a very large area required for obtaining a desired oxygen absorbing ability, or iron powder required to be made particularly fine. On the other hand, if the thickness exceeds 5 mm, uniform drawing may not be conducted due to difficulty in keeping a uniform drawing temperature at the time of the drawing processing performed after the sheet processing, or the drawing stress may be so large that processing on a normal machine is made difficult.

Furthermore, by forming the oxygen absorbing resin composition into a sheet and implementing a uniaxial or biaxial drawing, obtained is a porous oxygen absorbing sheet having a number of small voids (microvoids) produced in the thermoplastic resin sheet. The oxygen absorber comprising iodine, metal iodide salt and iron powder uniformly dispersed in the aforementioned sheet, contacts the outside air through the microvoids, and thereby allows effective absorption of the oxygen held in the space inside the packet.

In this case, the drawing rate of the sheet is preferably 1.5 to 12 times the original size. This is because, if the drawing rate of the sheet is less than 1.5 times the original size, not many microvoids will be produced, and the uniformly-dispersed oxygen absorber will not have enough contact with the air and may not show an outstanding oxygen absorbing ability. Furthermore, if the drawing rate of the sheet is more than 12 times the original size, the obtained oxygen absorbing resin composition may not be put to practical use because the film intensity will be considerably reduced in the drawing direction and the oxygen absorber will easily break upon application of a small force. Regarding the temperature for drawing the sheet, any temperature that allows processing may be suitably set. However, microvoids are easily produced if drawing is implemented at a temperature 3 to 7° C. lower than the fusing point of the thermoplastic resin, and preparation of an oxygen absorbing sheet having a high oxygen absorbing ability is made possible.

As a product preserving method, a product having a water activity of 0.1 or more is put into a gas-barrier container together with the aforementioned oxygen absorber packet, and the oxygen inside the container is rapidly deoxidized, whereby the quality of the product is preserved over a long period of time. The oxygen absorber packet according to the present invention is characterized by its favorable oxygen absorbing ability in a low-humidity environment. The oxygen absorber packet is powerful in preserving low water-content products having a water activity of 0.1 to 0.6, especially 0.2 to 0.5.

The shape and the material of the gas-barrier container (may be hereinafter simply referred to as the "container") are not limited, and may be selected from, for example, metal cans, glass jars, plastic containers or bags, etc., as long as it can be sealed and has a substantial gas-barrier property.

For example, multilayered sheets or films, or containers or bags made of sheets, having an oxygen permeability of under 0–100 cc/m$^2$/24 hr/atm (25° C., 50% RH), more preferably under 0–50 cc/m$^2$/24 hr/atm (25° C., 50% RH) are conveniently used. Examples of such gas-barrier containers include: laminated bodies of polyethylene terephthalete/vapor-deposited aluminum/polyethelene, oriented polypropylene/polyvinylalcohol/polyethylene, polyvinylidene chloride coated (K-coat) oriented nylon/polyethylene, aluminum foil/polyethelene, etc., or coextruded laminates of MXD6 nylon.

The oxygen absorbing sheet according to the present invention is devised in various forms, which is preferably an oxygen absorber packet made by cutting a porous oxygen absorbing sheet into small pieces and wrapping them with a gas-permeable packaging material. Examples of such forms include: a bag-type oxygen absorber which is prepared by forming a small bag out of a gas-permeable packaging material and filling an oxygen absorbing composition into such bag; or a label-type oxygen absorber comprising an air permeable composition packet on one side and an adhesive on the other side, which may be easily and conveniently adhered; or a lid-type oxygen absorber in a form of a packing lid, wherein a gas-permeable packaging material is used for attaching the oxygen absorbing resin composition to the center of one side of the barrier packing lid and the packing lid is placed to contact the opening of a jar.

A food package, comprising a label-type oxygen absorber attached thereto, is sealed in a gas-barrier container together with food or other products to be preserved, so that the oxygen absorber absorbs sufficient oxygen and may be effective in preserving the product.

Oxygen absorbing sheets or porous oxygen absorbing sheets comprising the oxygen absorbing resin composition according to the present invention are laminated and provided as an oxygen absorbing layer between an oxygen permeating layer made of an oxygen permeating thermoplastic resin and a gas-barrier layer made of a gas-barrier material. An oxygen absorbing multilayered body is thus obtained. In other words, one mode of the present invention is an oxygen absorbing laminated body comprising at least three layers, i.e., an oxygen permeating layer including an oxygen permeating thermoplastic resin, an oxygen absorbing layer including the oxygen absorbing resin composition according to the present invention, and a gas-barrier layer including a gas-barrier material.

If the oxygen absorbing resin composition according to the present invention is made as a multilayered film or sheet, a gas-barrier layer must be provided at least on one side of the oxygen absorbing resin layer including the oxygen absorbing composition, while an inner layer must be provided on the other side of the oxygen absorbing resin layer.

In the case where the oxygen absorbing resin is made a packaging container, the oxygen permeating layer is provided so as to prevent preserved products from directly touching the oxygen absorbing layer. The oxygen permeating layer may be used also as a sealant layer.

The resin used for the oxygen permeating layer is suitably selected after considering adhesion with the oxygen absorbing layer. The thickness of the oxygen permeating layer is set within a range of 20 to 180 $\mu$m, and the oxygen permeability of the layer is preferably 100 cc/m$^2$/atm/day or more, more preferably 200 cc/m$^2$/atm/day or more. Furthermore, pigments, slipping agents, etc. may be suitably added to the oxygen permeating layer.

As a resin for the oxygen permeating layer, thermoplastic resins are preferably used. Examples of such thermoplastic resins include polyolefines such as low-density polyethylene, low-density linear polyethylene, high-density polyethylene, polypropylene, poly methyl pentene, and acidically modified polyolefines thereof, polystyrenes such as polysterene and modifications thereof, various ethylene copolymers such as etylene-vinyl acetate copolymer, etylene-methyl metacrylate copolymer, etylene-ethyl acrylate copolymer, etylene-acrlylic acid copolymer, etylene-propylene copolymer, and elastomers. Among these resins, polyethylene and polypropylene are preferably used due to their high chemical resistance, heat resistance and sanitary property. These resins are used individually or suitably blended.

Regarding the oxygen absorbing composition used for the oxygen absorbing layer, the oxygen absorbing composition above is to be used. In respect to the thermoplastic resin used for the oxygen absorbing layer, various types of resins used for the oxygen permeating layer are used. Activated carbon, zeolite, titanium oxide, and other additives may be added to the oxygen absorbing layer.

The thickness of the oxygen absorbing sheet forming the oxygen absorbing layer is preferably 20 to 200 $\mu$m, and is suitably selected after considering the required oxygen absorbing property, processability, mechanical property, etc.

Although there is no specific limitation to the gas-barrier layer as long as such layer avoids permeation of oxygen and moisture, it is preferable to use the following materials: Resin films comprising aluminum foil and other metallic foils or metals or metal oxides such as aluminum, aluminum oxide, silicon oxide evaporated thereon, or nylons such as MXD6 (poly(metaxylene diamine adipamide)), or non-crystal polyamide, or resins such as ethylene-vinyl alcohol copolymer resins, or polyvinylidene chloride, or films coated with polyvinylidene chlorides, all of which may be drawn or laminated and compounded with other resins as required, to an extent not impairing the gas-barrier property. The oxygen permeability of the gas-barrier layer is preferably under 100 cc/m$^2$/atm/day, more preferably under 50 cc/m$^2$/atm/day.

Outside the gas-barrier layer, it is preferable that a protection layer made of thermoplastic resin is further provided. Examples of the thermoplastic resins used for the protection layer include: polyethylenes such as low-density polyethylene, low-density linear polyethylene, high-density polyethylene, various polypropylenes, nylon 6, nylon 6,6, polyethylene terephthalate and combinations thereof.

As for the method of laminating the oxygen absorbing multilayered body according to the present invention, known art such as extrusion and lamination, dry lamination, coextrusion, blow molding can be used, depending on the structure of the multilateral body, and materials and properties of respective layers.

According to the present invention, arrangement and use of an oxygen absorbing multilayered body on part of or the entire inner surface of the packaging container allows absorption and removal of the oxygen generating from a preserved product including peroxide, which has been sealed inside the container. As a result, change in the quality of the product due to oxygen held in the product including peroxide is prevented, as well as change in the appearance, burst or breakage of the container due to rise of the pressure inside the packaging container. The oxygen absorbing multilayered body may be used on the entire walls of a packaging container. Otherwise, the oxygen absorbing multilayered body may be used partly on the walls of the sealed container, while a gas-barrier material not having an oxygen absorbing property may be used on any other wall portions of the packaging container.

Various types of oxygen absorbers or oxygen absorbing multilayered bodies including the oxygen absorbing resin composition according to the present invention demonstrate an oxygen absorbing property in an environment where a relative humidity (RH) is 10 to 70% or 20 to 70%, especially 20 to 50%. Accordingly, these oxygen absorbers or oxygen absorbing multilayered bodies are powerful in preserving low water-content products which have a low water content and generate little moisture, namely products having a water activity of 0.1 to 0.7, or 0.2 to 0.7, especially 0.2 to 0.5, where conventional self-reacting oxygen absorber could not be applied. In other words, these oxygen absorbers or oxygen absorbing multilayered bodies are preferably used for preserving products having low water activity and requiring dry condition and low humidity upon preservation.

Products having the aforementioned water activity fall under the category of low water-content products. However, the present invention may be particularly applied to the preservation of products having a water activity of 0.1 or more and disfavoring moisture, for example, low water-content products (packaged products) such as dried foods, fried snacks and other kinds of foods, powdered or granulated products, medicines, dietary foods, etc. Examples of such products include: powdered soup stock, powdered drinks, powdered sweets, seasonings, powdered grains, nutritious foods, dietary foods, artificial colorings, artificial tastes, spices, powdered or granulated medicines, powder soap, tooth paste, industrial chemicals and compacts thereof (tablet-type products).

Regarding the resin composition according to the present invention, reference may be made to known prior art for any known component, contained amount or manufacturing method. For example, reference may be made to the Japanese Patent (Kokoku) Publication No. SHO 56-33980 filed by the inventors of the present invention.

DETAILED DESCRIPTION OF THE PREFERRED EMBODIMENTS

Details of the preferred embodiments according to the present invention is explained below.

EXAMPLE 1

In a gas-barrier bag, 100 g of iron powder (maximum particle diameter: 150 $\mu$m) was stirred and mixed with 2 g of iodine which had been ground down in a mortar, whereby an oxygen absorbing composition 1 having a water content of 0.1% by weight or less was obtained. The ratio of the components was iodine 2 parts by weight per iron powder 100 parts by weight.

Seven tenths of a gram (0.7 g) of this oxygen absorbing composition was filled in a small bag (37 mm×40 mm) made of a gas-barrier material (polystyrene non-woven fabric made by Du Pont Co., Inc.; product name: "Tyvek"), and many oxygen absorbing packets were thus prepared.

Subsequently, these oxygen absorber packets were put and sealed in gas-barrier bags made of laminated film of K-coat nylon/polyethylene together with pieces of cotton impregnated with 10 ml glycerin solutions of different densities, and the bags were sealed after filling 250 ml of air. The bags were kept at 25° C. and an oxygen absorption test was implemented by measuring the oxygen concentration inside the bag over a certain period. The results are shown in Table 1.

The humidity of the environment is adjusted by the glycerin solutions, and the relative humidity (RH) is 50% when the glycerin solution is 79% by weight, 40% when the glycerin solution is 86% by weight, and 30% when the glycerin solution is 92% by weight.

EXAMPLE 2

Five kilograms of iron powder (maximum particle diameter: 150 $\mu$m) was put in a vacuum drier, and an aqueous solution prepared by dissolving 50 g of iodine and 50 g of potassium iodide in 100 ml of water was sprayed as the iron powder was stirred and mixed under reduced pressure of 60 mmHg. After drying the iron powder at 120° C. for one hour, a granular-type oxygen absorbing composition 2 having a water content of 0.1% by weight or less was obtained. The ratio of the respective components was iodine 1 part by weight and potassium iodide 1 part by weight per iron powder 100 parts by weight.

An oxygen absorption test was performed in the same manner as in Example 1 except that oxygen absorbing composition 2 was used instead of oxygen absorbing composition 1. The results are shown in Table 1.

EXAMPLE 3

Five kilograms of iron powder (maximum particle diameter: 150 $\mu$m) was put in a vacuum drier, and an aqueous solution prepared by dissolving 70 g of iodine and 30 g of potassium iodide in 200 ml of water was sprayed as the iron powder was stirred and mixed under reduced pressure of 60 mmHg. After drying the iron powder at 120° C. for one hour, a granular-type oxygen absorbing composition 3 having a water content of 0.1% by weight or less was obtained. The ratio of the respective components was iodine 1.4 parts by weight and potassium iodide 0.6 parts by weight per iron powder 100 parts by weight.

An oxygen absorption test was performed in the same manner as in Example 1 except that oxygen absorbing composition 3 was used instead of oxygen absorbing composition 1. The results are shown in Table 1.

EXAMPLE 4

Five kilograms of iron powder (maximum particle diameter: 150 $\mu$m) was put in a vacuum drier, and an aqueous solution prepared by dissolving 50 g of iodine and 50 g of sodium iodide in 100 ml of water was sprayed as the iron powder was stirred and mixed under reduced pressure of 60 mmHg. After drying the iron powder at 120° C. for one hour, a granular-type oxygen absorbing composition 4 having a water content of 0.1% by weight or less was obtained. The ratio of the respective components was iodine 1 part by weight and sodium iodide 1 part by weight per iron powder 100 parts by weight.

An oxygen absorption test was performed in the same manner as in Example 1 except that oxygen absorbing composition 4 was used instead of oxygen absorbing composition 1. The results are shown in Table 1.

EXAMPLE 5

Five kilograms of iron powder (maximum particle diameter: 150 μm) was put in a vacuum drier, and an aqueous solution prepared by dissolving 50 g of iodine and 50 g of calcium iodide in 100 ml of water was sprayed as the iron powder was stirred and mixed under reduced pressure of 60 mmHg. After drying the iron powder at 120° C. for one hour, a granular-type oxygen absorbing composition 5 having a water content of 0.1% by weight or less was obtained. The ratio of the respective components was iodine 1 part by weight and calcium iodide 1 part by weight per iron powder 100 parts by weight.

An oxygen absorption test was performed in the same manner as in Example 1 except that oxygen absorbing composition 5 was used instead of oxygen absorbing composition 1. The results are shown in Table 1.

(Comparison 1)

Five kilograms of iron powder (maximum particle diameter: 150 μm) was put in a vacuum drier, and an aqueous solution prepared by dissolving long of calcium chloride in 100 ml of water was sprayed as the iron powder was stirred and mixed under reduced pressure of 60 mmHg. After drying the iron powder at 120° C. for one hour, a granular-type oxygen absorbing composition 6 having a water content of 0.1% by weight or less was obtained. The ratio of the respective components was calcium chloride 2 parts by weight per iron powder 100 parts by weight.

An oxygen absorption test was performed in the same manner as in Example 1 except that oxygen absorbing composition 6 was used instead of oxygen absorbing composition 1. The results are shown in Table 1.

(Comparison 2)

Five kilograms of iron powder (maximum particle diameter: 150 μm) was put in a vacuum drier, and an aqueous solution prepared by dissolving 100 g of potassium iodide in 100 ml of water was sprayed as the iron powder was stirred and mixed under reduced pressure of 60 mmHg. After drying the iron powder at 120° C. for one hour, a granular-type oxygen absorbing composition 7 having a water content of 0.1% by weight or less was obtained. The ratio of the respective components was potassium iodide 2 parts by weight per iron powder 100 parts by weight.

An oxygen absorption test was performed in the same manner as in Example 1 except that oxygen absorbing composition 7 was used instead of oxygen absorbing composition 1. The results are shown in Table 1.

TABLE 1

(Figures in the chart show the percentage of oxygen concentration)

| | RH 100%; First Day | RH 50%; First Day | RH 40%; First Day | RH 30%; Eighth Day |
|---|---|---|---|---|
| Example 1 | 0.1 or less | 0.1 or less | 0.1 or less | 0.1 or less |
| Example 2 | 0.1 or less | 0.1 or less | 0.1 or less | 0.1 or less |
| Example 3 | 0.1 or less | 0.1 or less | 0.1 or less | 0.1 or less |
| Example 4 | 0.1 or less | 0.1 or less | 0.1 or less | 2.0 |
| Example 5 | 0.1 or less | 0.1 or less | 0.1 or less | 4.2 |
| Comparison 1 | 0.1 or less | 15.9 | 16.6 | 18.7 |
| Comparison 2 | 0.1 or less | 4.1 | 6.2 | 4.8 |

As shown in Table 1, in Comparisons 1 and 2, where oxygen absorbing compositions including iron powder coated with only calcium chloride or potassium iodide were used, not enough oxygen absorption was implemented when the RH (humidity) of the environment was low. On the other hand, in Examples 1 through 5, where the oxygen absorbing composition according to the present invention was used, rapid decline of oxygen concentration was observed even when the RH of the environment was low, thereby showing that the oxygen absorbing composition according to the present invention demonstrates a favorable oxygen absorbing performance in an environment of a low relative humidity.

EXAMPLE 6

The oxygen absorber packet obtained in Example 2 and 20 g of commercial lemon pop candy (solid powder candy) having a water activity of 0.26 were put and sealed into a gas-barrier bag (150 mm×220 mm) made of K-coat nylon/polyethylene after filling 35 ml of air. The oxygen concentration inside the sealed bag was 0.1% or less when measured after preserving the sealed bag for one month at 25° C. Even after the preservation, the lemon pop candy maintained its favorable taste and feeling on the tongue.

(Comparison 3)

An oxygen absorption test of commercial lemon pop candy was performed in the same manner as in Example 6 except that oxygen absorbing composition obtained in Comparison 1 was used instead of the oxygen absorber packet obtained in Comparison 2. After preserving the bag for one month, the oxygen concentration inside the bag was 18.0%, and almost no oxygen absorption took place. The taste of the lemon pop candy had deteriorated.

(Comparison 4)

An oxygen absorption test of commercial lemon pop candy was performed in the same manner as in Example 6 except that a self-reacting oxygen absorber (product name: "Ageless Z-30PT"; manufactured by MITSUBISHI GAS CHEMICAL CO., INC.) was used as the oxygen absorber packet. After preserving the bag for one month, the oxygen concentration inside the bag was 0.1% or less. Although there was no change in the taste of the lemon pop candy, it had absorbed water from the oxygen absorber and the original feeling on the tongue had been impaired.

As explained above, although the oxygen absorbing composition according to the present invention falls under the so-called "mosiure-dependent oxygen absorber" which does not hold any water in itself, the oxygen absorber demonstrates a favorable oxygen absorbing performance in a low-humidity environment, where conventional "moisture-dependent oxygen absorbers" are insufficient therefor.

The present invention allows preservation of products having a low water content without a concern that water would be absorbed. The present invention is suitable for deoxidization and preservation of medicines or foods in a dry state, having a water content of 0.1 to 0.6 and disfavoring moisture. These products may be preserved for a long time with their qualities maintained.

EXAMPLE 7

Iron powder 100 parts by weight, having an average particle diameter of 70 μm and a maximum particle diameter of 150 μm, was put in a drier capable of reducing pressure. Thereafter, while the iron powder was stirred and mixed under reduced pressure of 60 mmHg, an aqueous solution prepared by dissolving iodine 2 parts by weight and potassium iodide 3 parts by weight was added in a manner such that the solution was sprinkled directly on the iron powder. The iron powder was further mixed and dried for one hour at 120° C. under a reduced pressure of 60 mmHg, and a granular-type oxygen absorbing composition was obtained.

Subsequently, by using a biaxial extruder, the aforementioned oxygen absorbing composition, polypropylene, and calcium oxide were mixed and kneaded at 220° C. at a rate of 68:30:2, thereafter extruded, cooled and smashed, and a resin composition was prepared.

This resin composition was provided to the extruder and an oxygen absorbing sheet having a thickness of 1 mm was obtained from a T-shaped die. After cutting the sheet into 95 mm squares, uniaxial extrusion was implemented, and the size of the cut-out resin composition was made six times larger at 120° C., whereby a porous oxygen absorbing sheet was obtained.

The water content of the oxygen absorbing sheet was 500 ppm or less when measured by Karl Fischer's Method.

Subsequently, an oxygen absorbing sheet weighing 2.23 g was put into two different gas-barrier bags made of laminated film of K-coat nylon/polyethylene together with a piece of cotton each, one impregnated with 10 ml of water and the other impregnated with 10 ml of glycerin solution 92% by weight for adjusting the relative humidity inside the bags to 100% or 30% respectively. After filling 250 ml of air, the bags were sealed and completed. The bags were kept for four days at 25° C., and the oxygen concentration inside the bag was measured with a zirconic oxygen analyzer (made by Toray Engineering Co., Ltd.). After preservation at the relative humidity of 100% or 30%, the oxygen concentration had both decreased to less than 0.1% in both cases.

(Comparison 5)

The sealed bags were prepared and the oxygen concentrations inside the bags were measured in the same manner as in Example 7 except that a solution prepared by dissolving potassium chloride 5 parts by weight was used instead of the aforementioned solution prepared from iodine 2 parts by weight and potassium iodide 3 parts by weight. The oxygen concentration of the bag preserved with an inner relative humidity of 100% had decreased to less than 0.1%, while the oxygen concentration bag preserved with an inner relative humidity of 30% was 18.5%.

EXAMPLE 8

Iron powder 100 parts by weight, having an average particle diameter of 70 μm and a maximum particle diameter of 150 μm, was put in a vacuum drier. An aqueous solution prepared by dissolving iodine 2 parts by weight and calcium iodide 3 parts by weight was sprayed as the iron powder was stirred and mixed under reduced pressure of 60 mmHg. The iron powder was further mixed and dried for one hour at 120° C., whereby a granular-type oxygen absorbing composition having a water content of 0.1% or less was prepared. After mixing the oxygen absorber 100 parts by weight with activated carbon 1 part by weight, calcium oxide 2 parts by weight and polypropylene 50 parts by weight, the obtained mixture was fused and kneaded at 190° C., and, using an extruder, a pellet including the oxygen absorbing resin composition was obtained.

In the same manner as in Example 7, 0.89 g of the obtained porous oxygen sheet was placed in a gas-permeable packaging material made of a porous polyester film and formed into an oxygen absorbing resin packet, and the produced packet and 20 g of cookies (water activity: 0.4) were put and sealed into a gas-barrier bag made of compound film (K-coat nylon/polyethylene) after filling the bag with 35 ml of air. The oxygen concentration inside the bag was 0.1% or less when measured after preserving the sealed bag for one month at 25° C. Even after preservation, the cookies maintained their favorable taste and crispness.

(Comparison 6)

The same procedure was performed as in Example 8 except that 0.89 g of the oxygen absorbing sheet prepared in Comparison 5 was used. After preserving a sealed bag containing the oxygen absorber packet and the cookies for one month at 25° C., the oxygen concentration inside the bag was 18.0%. Although the cookies remained crispy, their taste had deteriorated.

(Comparison 7)

The same procedure was performed as in Example 8 except for using a self-reacting oxygen absorber (product name: "Ageless Z-30PT"; manufactured by MITSUBISHI GAS CHEMICAL CO., INC.) made by filling the iron oxygen absorber holding moisture into a gas-permeable bag. After preserving the sealed bag containing the oxygen absorber packet and the cookies for one month at 25° C., the oxygen concentration inside the bag was 0.1% or less. Although the cookies maintained their favorable taste, the crispness had been impaired due to the cookies absorbing some moisture.

EXAMPLE 9

Iron powder 100 parts by weight, having an average particle diameter of 70 μm and a maximum particle diameter of 150 μm, was put in a vacuum drier. An aqueous solution prepared by dissolving iodine 5 parts by weight and sodium iodide 5 parts by weight was sprayed as the iron powder was stirred and mixed under reduced pressure of 60 mmHg. The iron powder was further mixed and dried for one hour at 120° C., whereby a granular-type oxygen absorbing composition having a water content of 0.1% by weight or less was obtained.

<Structure of Oxygen Absorbing Multilayered Body>

A sheet made of low-density linear polyethylene was heated and softened, and the oxygen absorber obtained in Example 9 was sprinkled on the sheet. Subsequently, fused low-density linear polyethylene was further extruded in a manner such that the oxygen absorber above as placed between the polyethylene layers. A cooling roll provided with a specular finish was pressed from the side of the extruded resin, and obtained was an oxygen absorbing sheet having a thickness of 250 μm, including an oxygen absorbing resin composition made of an oxygen absorber 100 parts by weight and low-density linear polyethylene 40 parts by weight. Thereafter, by using a co-extruder comprising two uniaxial extruders, T-shaped die and a cooling roll, low-density linear polyethylene comprising titanium oxide (average particle diameter: 0.25 μm; specific gravity: 4 g/cc) blended at the rate of 10% by weight was extruded as an oxygen permeating layer onto a surface where the cooling roll was pressed. On the other surface, an ethylene-vinyl alcohol film and a polypropylene film were superposed, and obtained was an oxygen absorbing laminate having a structure of low-density linear polyethylene (inner layer: 70 μm)/oxygen absorber layer (250 μm)/modified polyolefine layer (adhesive layer: 10 μm)/ethylene-vinyl alcohol layer (barrier layer: 20 μm)/modified polyolefine layer (adhesive layer: 10 μm)/polypropylene layer (outer layer: 250 μm). The sheet was formed into a shape of 12 cm (length)×18 cm (width)×1.5 cm (depth) and an oxygen absorbing tray was thus prepared. One hundred and fifty tablets of tablet-type dietary food containing 50 mg of vitamin C, having a water content of 0.3, was put into the tray together with 300 ml of air. The tray was sealed using a top film composed of low-density linear polyethylene/adhesive layer (250 μm)/aluminum foil/polypropylene. After preserving the tray for 6 months in a condition of 30° C. and a relative humidity of 50%, the inner oxygen concentration was measured as 0.03%. When the gross vitamin C of the dietary food held inside the tray was measured, vitamin C was preserved at a rate of 92%.

(Comparison 8)

A low-moisture product package was produced and a preservation test regarding such product was performed in the same manner as in Example 7, except that an aqueous solution prepared by dissolving sodium chloride 10 parts by weight was used instead of the aqueous solution used in Example 9, which was prepared by dissolving iodine 5 parts by weight and sodium iodide 5 parts by weight.

After preserving the packet for six months, the oxygen concentration inside the packet was measured as 4.5%. Upon measuring the gross vitamin C held in the dietary food kept inside, vitamin C was maintained at a rate of 62%, and reduction of vitamin C was observed.

As explained above, the present invention provides an oxygen absorbing resin composition capable of accomplishing a sufficient oxygen absorbing reaction even in a low-humidity environment. Accordingly, the packaging material obtained from this oxygen absorbing resin composition ensures preservation of not only high water-activity products having a high water activity, but also dried foods such as powder foods and other preserved products in a low-oxygen environment without causing any deterioration of the quality or the property of the product preserved. Furthermore, since moisture from the packaging material is not transferred to the preserved product, oxygen absorption of food, powder materials, dietary foods and medical products, etc. disfavoring moisture and having a relatively low water content is made possible, without moisture being absorbed by the products preserved. As a result, the products are preserved without their quality being deteriorated due to the oxygen. The resin composition according to the present invention is a new oxygen absorbing resin composition suitable for preserving products having a low water content.

What is claimed is:

1. An oxygen absorbing composition comprising iron powder and an iodine molecule ($I_2$), which demonstrates a sufficient deoxidizing performance even in a low-humidity environment, wherein the water content of said oxygen absorbing composition is 1% by weight or less, and the weight of said iodine molecule is 0.1 to 10 parts by weight per iron powder 100 parts by weight.

2. An oxygen absorbing composition according to claim 1, further including metal iodide, wherein the sum of the weights of said iodine molecule ($I_2$) and said metal iodide is 0.1 to 10 parts by weight per iron powder 100 parts by weight.

3. An oxygen absorbing composition according to claim 2, wherein said metal iodide is a metal iodide of alkaline metal or a metal iodide of alkaline earth metal.

4. An oxygen absorbing composition according to claim 3, wherein said metal iodide of alkaline earth metals is sodium iodide, potassium iodide or calcium iodide.

5. An oxygen absorbing composition according to claim 2, wherein a surface of said iron powder is coated with a mixture of said iodine and said metal iodide.

6. An oxygen absorbing resin composition comprising the oxygen absorbing composition according to claim 1 and thermoplastic resin.

7. An oxygen absorbing resin composition according to claim 6, further including metal iodide.

8. An oxygen absorbing resin composition according to claim 7, wherein said oxygen absorbing composition comprises iron powder 100 parts by weight, metal iodide 0.01 to 20 parts by weight, and iodine 0.01 to 20 parts by weight.

9. An oxygen absorbing resin composition according to claim 8, wherein said oxygen absorbing composition comprises iron powder coated with said iodine and said metal iodide.

10. An oxygen absorbing resin composition according to claim 8, wherein said metal iodide is a metal iodide of alkaline metal or alkaline earth metal.

11. An oxygen absorbing resin composition according to claim 8, wherein the weight of the iodide ion ($I^-$) included in said oxygen absorbing composition is larger than ½ weight of the iodine ($I_2$).

12. An oxygen absorbing resin composition according to claim 8, wherein the water content of said oxygen absorbing composition is 1% by weight or less.

13. An oxygen absorber packet made by filling the oxygen absorbing composition according to claim 1 in a small bag made of a gas-permeable material.

14. An oxygen absorbing sheet having a thickness of 20 $\mu$m to 5 mm, which comprises the oxygen absorbing resin composition according to claim 7.

15. A porous oxygen absorbing sheet made by the oxygen absorbing sheet according to claim 14 being drawn 1.5 to 12 times the original size in at least one axial direction.

16. A bag-type oxygen absorber made by wrapping the oxygen absorbing sheet according to claim 14 with a gas-permeable material.

17. A label-type oxygen absorber made by laminating a cover sheet, the oxygen absorbing sheet according to claim 14, and an adhesive layer for adhesion.

18. An oxygen absorbing multilayered body prepared by laminating oxygen permeating layers including an oxygen permeating thermoplastic resin, the oxygen absorbing sheet according to claim 14, and a gas-barrier layer made of a gas-barrier material.

19. A method of preserving low water-content products, wherein a preserved product having a water activity of 0.1 to 0.7 is placed and sealed into a gas-barrier container together with the oxygen absorber packet according to claim 13.

20. A method of preserving low water-content products, wherein said preserved product has a water activity of 0.2 to 0.5.

21. A method of preserving low water-content products, wherein a preserved product having a water activity of 0.1 to 0.7 is sealed in a gas-barrier container together with the oxygen absorbing sheet according to claim 14.

22. A method of preserving low water-content products, wherein a preserved product having a water activity of 0.1 to 0.7 is sealed into a container, at least a part of which is made of an oxygen absorbing multilayered body according to claim 18.

23. A preserving method according to claim 21, wherein said preserved product has a water activity of 0.2 to 0.5.

24. A package made by placing and sealing the preserved product and the oxygen absorbing packet according to claim 13 into a gas-barrier container.

25. A package prepared by placing and sealing a preserved product into the container, at least a part of which is made of the oxygen absorbing multilayered body according to claim 18.

26. An oxygen absorbing composition according to claim 2, wherein the sum of the weights of said iodine molecule ($I_2$) and said metal iodide is 0.5 to 6 parts by weight per iron powder 100 parts by weight.

27. An oxygen absorbing composition according to claim 2, wherein the weight of iodide ion ($I^-$) is larger than ½ weight of said iodine molecule ($I_2$).

28. An oxygen absorbing composition according to claim 1, wherein said oxygen absorbing composition is capable of absorbing oxygen in an environment of 10% to 50% relative humidity.

29. An oxygen absorbing composition according to claim 2, wherein said oxygen absorbing composition is capable of absorbing oxygen in an environment of 10% to 50% relative humidity.

* * * * *